July 6, 1965 J. D. RUHALA ETAL 3,193,183
THROTTLE VALVE CONTROL APPARATUS
Filed Oct. 17, 1962

INVENTORS
Joseph D. Ruhala &
BY Robert A. Martin
J. L. Carpenter
ATTORNEY

United States Patent Office 3,193,183
Patented July 6, 1965

3,193,183
THROTTLE VALVE CONTROL APPARATUS
Joseph D. Ruhala, Royal Oak, and Robert A. Martin, Birmingham, Mich., assignors to General Motors Corporation, Detroit, Mich., a corporation of Delaware
Filed Oct. 17, 1962, Ser. No. 231,245
1 Claim. (Cl. 230—31)

This invention relates to an engine throttle valve control and more particularly to a device which regulates the throttle value so as to meet the power input requirements of a pressure generator, such as that of an air conditioning unit, driven by the engine.

One of the problems arising from the installation in an automobile of an air conditioning unit driven by the car engine is the tendency of the engine to stall while idling due to the increased load placed thereon. It would be an inefficient solution to adjust the throttle for an increased idling speed since the air conditioner is not always in use.

It is an object of the present invention to provide a means for increasing the idling speed of the automobile engine in response to the increased load placed thereon by an air conditioning unit driven by the engine.

Briefly, these aspects are accomplished in accordance with the invention by a throttle valve control which includes a Bourdon tube operatively associated therewith and connected to the compressor of the air conditioning unit such that as pressure is built up by the compressor and an increased load thereby placed on the engine, the Bourdon tube will force the throttle valve open so as to increase the idling speed of the engine.

Other objects and advantages of the present invention will be apparent from the following description of two embodiments thereof made with reference to the accompanying drawings, in which.

Figure 1:
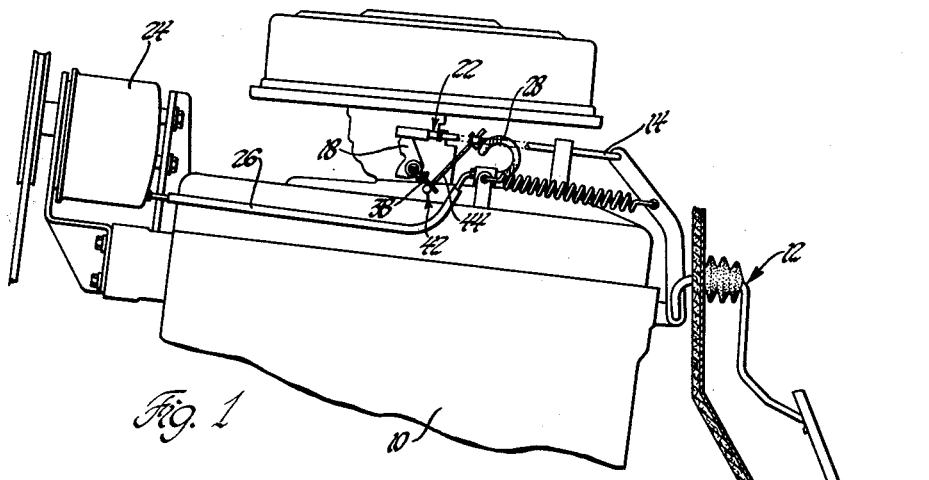
FIGURE 1 is a side view of the control showing its position with relation to the automobile engine, the refrigerant compressor of the air conditioning unit, and the foot pedal control for the throttle valve.
Figure 2:
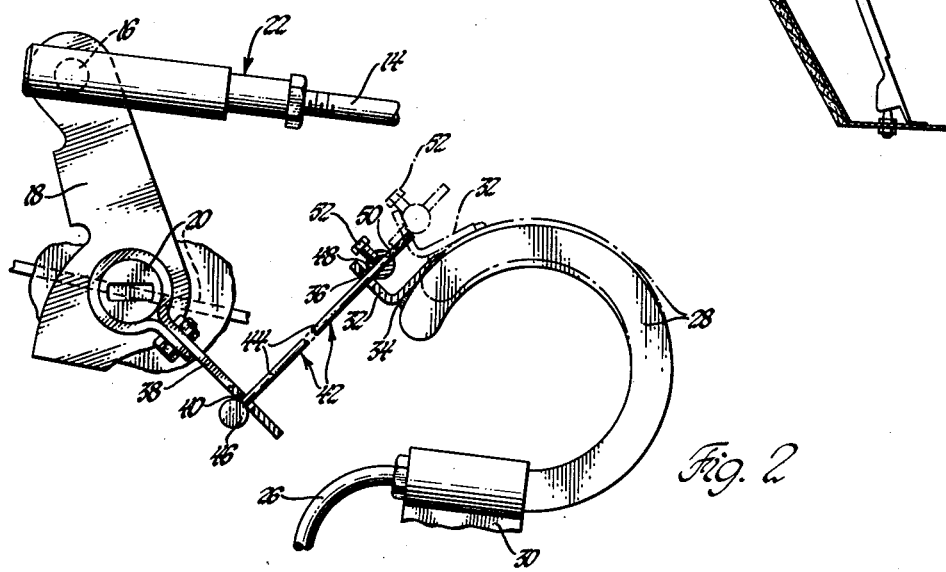
FIGURE 2 is an enlargement of the control shown in FIGURE 1, partly in section.

In the drawings reference numeral 10 designates the automobile engine to which is attached the usual foot pedal throttle control means 12 including throttle rod 14. Throttle rod 14 is attached through a pivot pin 16 to a throttle arm 18 which is fixed to the throttle valve 20. The throttle rod 14 includes the usual threaded connection 22 for shortening or lengthening the rod for manual adjustment of the idling speed.

On the front of the engine 10 is mounted the refrigerant compressor 24 of an air conditioning unit. Connected to a source of pressure within the compressor 24 is a line 26 through which pressure may be transmitted. At its other end line 26 is connected to a Bourdon tube 28.

The Bourdon tube 28 is fixed, as at 30, with respect to the engine 10. On the other end of the Bourdon tube 28 a right angle bracket 32 is mounted as by soldering 34 or other suitable means. In the upstanding leg of the bracket 32 is a hole 36.

Fixed to the throttle valve 20 is a connecting arm 38 having a hole 40 near its end. Inserted through the holes 36, 40 is a tension wire assembly 42 consisting of a rigid wire 44, a stop 46 fixed at one end, and an adjustable stop 48 mounted on the other end of the rigid wire 44. The adjustable stop 48 has a hole 50 therethrough so that it may slide upon the rigid wire 44. Inserted in the adjustable stop 48 is a screw 52 to bear against the rigid wire 44 and prevent the stop 48 from sliding.

It will thus be seen that as pressure is built up in the compressor 24, that presure will be transmitted to the Bourdon tube 28 through the line 26. The increased pressure in the Bourdon tube 28 will cause one end thereof to move with respect to the other. Such a movement will be transmitted through the tension wire assembly 42 and the connecting arm 38 to the throttle valve 20, causing the throttle valve to open.

It will be noted that the throttle control apparatus does not interfere with the normal operation of the automobile. As the operator requires more speed his desires are transmitted through the foot pedal throttle control means 12, the throttle rod 14, and the throttle arm 18 to the throttle valve 20. Since the connecting arm 38 is fixed to the throttle valve 20, it also moves at such a time. However, the Bourdon tube 28 will not be affected since the tension wire 42 will slide in the holes 36, 40.

Figure 3:
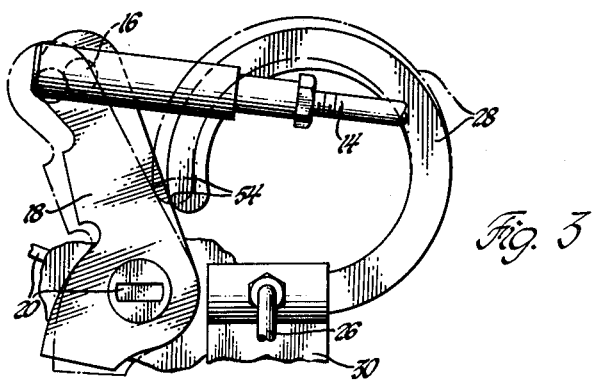
FIGURE 3 illustrates a modification of the control.

In the modification illustrated in FIGURE 3, the connecting arm 38, the tension wire assembly 42, and the bracket 32 are dispensed with. Instead, the free end of the Bourdon tube 28 bears directly against the throttle arm 18 as indicated by 54. Increased pressure in the condenser 24 will then be transmitted to the Bourdon tube 28 through the line 26 causing movement of the Bourdon tube. Such movement will be transmitted to the throttle valve 20 through the throttle arm 18. This embodiment does not interfere with normal operation as increased demands by the operator will cause throttle arm 18 to move away from the Bourdon tube 28.

While the above disclosure describes preferred embodiments of the invention, it is to be understood that other forms might be adopted as may come within the scope of the claim. It will also be obvious that this invention is applicable to systems other than automobile air conditioning units.

We claim:

In an automotive vehicle having an engine including a throttle valve rotatable between open and closed positions to vary the speed thereof and having an air conditioning unit including a referigerant compressor driven by said engine, means for regulating the idling speed of said engine sufficiently to compensate for the increased load placed thereon by the operation of said air conditioning unit comprising a line through which pressure may be transmitted connected at one end to said refrigerant compressor; a Bourdon tube fixed at one end relative to said engine and connected at said one end to the other end of said line whereby said tube is responsive to the pressure developed by said device; a right angle bracket having two legs fixed by one leg thereof to said tube adjacent the other end of said tube, the other leg of said bracket having a hole therethrough; a connecting arm secured at one end to said throttle valve and having a hole near the other end, said hole being approximately coaxial with said hole in said right angle bracket; and a tension wire slidingly inserted through both of said holes comprising a rigid wire of a diameter less than the diameter of either of said holes, adjusting means for changing the effective length of said tension wire mounted near one end of said rigid wire comprising a spherical stop of a diameter greater than the diameter of either of said holes slidingly mounted on said rigid wire and an adjusting screw threadedly inserted sufficiently far into said spherical stop to bear against said rigid wire, and a spherical stop fixed to the other end of said rigid wire on the side of the right angle bracket and the side of the arm opposite that side of the right angle bracket and that side of the arm on which the adjusting means is mounted.

References Cited by the Examiner

UNITED STATES PATENTS

| | | | |
|---|---|---|---|
| 238,894 | 3/81 | Gwyer | 251—12 |
| 607,491 | 7/98 | Swenson | 137—505.13 |
| 792,540 | 6/05 | McCoy | 103—18 |
| 1,773,775 | 8/30 | Childs | 251—12 |
| 2,286,758 | 6/42 | Nelson | 230—5 X |
| 2,535,617 | 12/50 | Westbrook | 103—16 |
| 2,634,681 | 4/53 | Rowell | 103—16 |
| 2,690,712 | 10/54 | Foote | 103—16 |
| 2,720,087 | 10/55 | Groene. | |
| 2,780,111 | 2/57 | Soete | 73—418 |
| 2,783,936 | 3/57 | Kistler | 230—3 |
| 2,929,226 | 3/60 | Baker et al. | 123—103 |
| 2,931,305 | 4/60 | Stratton | 103—16 |

FOREIGN PATENTS 446,806  10/12  France.

LAURENCE V. EFNER, *Primary Examiner.*